(12) United States Patent
Dalgic et al.

(10) Patent No.: US 6,925,076 B1
(45) Date of Patent: Aug. 2, 2005

(54) METHOD AND APPARATUS FOR PROVIDING A VIRTUAL DISTRIBUTED GATEKEEPER IN AN H.323 SYSTEM

(75) Inventors: Ismail Dalgic, Mountain View, CA (US); Jack Fijolek, Maperville, IL (US); Carl Ketcham, Taylorsville, UT (US)

(73) Assignee: 3Com Corporation, Marlborough, MA (US)

( * ) Notice: Subject to any disclaimer, the term of this patent is extended or adjusted under 35 U.S.C. 154(b) by 0 days.

(21) Appl. No.: 09/290,941

(22) Filed: Apr. 13, 1999

(51) Int. Cl.[7] .................... H04L 12/66; H04L 12/28; H04L 12/56
(52) U.S. Cl. .................. 370/356; 370/389; 370/392
(58) Field of Search ................ 370/352, 356, 370/389, 392, 260–271

(56) References Cited

U.S. PATENT DOCUMENTS

| | | | | |
|---|---|---|---|---|
| 6,014,379 A | * | 1/2000 | White et al. | 370/389 |
| 6,021,126 A | * | 2/2000 | White et al. | 370/352 |
| 6,069,890 A | * | 5/2000 | White et al. | 370/352 |
| 6,141,341 A | * | 10/2000 | Jones et al. | 370/352 |
| 6,324,279 B1 | * | 11/2001 | Kalmanek et al. | 379/229 |
| 6,404,736 B1 | * | 6/2002 | Arkko et al. | 370/230 |
| 6,445,695 B1 | * | 9/2002 | Christie, IV | 370/352 |
| 6,496,479 B1 | * | 12/2002 | Shionozaki | 370/230 |

FOREIGN PATENT DOCUMENTS

| | | | | |
|---|---|---|---|---|
| JP | 402134943 | * | 5/1990 | H04L/12/40 |

OTHER PUBLICATIONS

Newton, Newton's Telecom Dictionary, 1998, Telecom Books, 606–607.*

File history for U.S. Appl. No. 60/095,288, filed Aug. 4, 1998.

File history for U.S. Appl. No. 60/104,878, filed Oct. 20, 1998.

* cited by examiner

*Primary Examiner*—Chi Pham
*Assistant Examiner*—Ronald Abelson
(74) *Attorney, Agent, or Firm*—McDonnell Boehnen Hulbert & Berghoff LLP (57) ABSTRACT

A method and apparatus for improving the scalability of H.323 systems is described. An H.323 gateway can be modified to store call state information associated with a call on at least one of the ports of the modified H.323 gateway. The modified H.323 gateway can send registration, admission, and status requests to a modified H.323 gatekeeper. This relieves the modified H.323 gatekeeper of the need to maintain call status information for that call. If the modified H.323 gatekeeper fails, there is no disruption of the call or the billing information associated with the call. The modified H.323 gateway and the modified H.323 gatekeeper can be embodied in interface cards suitable for IP telephony gateways. Additionally, the modified H.323 gateway can support a standard network address translation protocol and an H.323 proxy service. These features help prevent users of the modified H.323 gateway from bypassing the billing and user authentication systems while also conserving the IP address space.

41 Claims, 3 Drawing Sheets

METHOD AND APPARATUS FOR PROVIDING A VIRTUAL DISTRIBUTED GATEKEEPER IN AN H.323 SYSTEM

BACKGROUND OF THE INVENTION

1. Field of the Invention

This invention relates to the field of H.323 multimedia conferencing. In particular, the invention relates to improvements for scaling H.323 systems.

2. Description of the Related Art

The International Telecommunications Union (ITU) has promulgated a number of different standards for telecommunications. The telecommunications standardization sector is referred to as the ITU-T. One of the standards developed by the ITU-T is the H.323 standard for video, or multimedia, communications over packet-switched networks. The H.323 standard uses other ITU-T standards for encoding, transmitting, and decoding the audio, video, data, and control information.

There are four primary types of devices in the H.323 standard: H.323 terminals, H.323 gateways, H.323 multipoint control units (MCUs) and H.323 gatekeepers. The terminals are multimedia terminals such as personal computers coupled to a local area network (LAN). The H.323 gateways allow the interconnection of other systems with an H.323 network. For example, an H.323 gateway could interconnect plain old telephone service (POTS) with an H.323 network. The gateways can also allow separate networks of H.323 devices to be bridged. The H.323 MCU provides support for multiparty conferencing, such as mixing and switching the audio and video signals, and bridging the conferencing setup signals. The H.323 gatekeeper provides registration, admission, and status services including authentication, address query resolution, and other services for H.323 devices.

One application of the H.323 standard is to replace circuit switched services with packet switched services. Plain old telephone service (POTS) is an example of a service provided on a circuit switched network. Each POTS call requires a dedicated circuit from end-to-end throughout the public switched telephone network (PSTN). By placing H.323 gateways and gatekeepers in telephone central office switching systems it is possible to carry a call over a packet switched network from central office to central office. Similarly, the H.323 standard can be used to provide telephone service over cable systems.

One important component of installing H.323 systems to replace circuit switched central office equipment or to provide telephone service over cable systems is supporting billing and other accounting services. To provide these services, the H.323 gatekeeper can be coupled to back-end servers (BESs) that provide authentication, accounting, billing, and other services.

The H.323 gatekeeper is also responsible for managing access to the network and controlling bandwidth usage. In order to accomplish these tasks, the prior art H.323 gatekeeper retains call status information throughout the call. This means that the H.323 gatekeeper includes data about calls in progress. When the call is finished, the H.323 gatekeeper interfaces with the BESs to update the billing and other information.

If the H.323 gatekeeper fails, all of the information about the calls handled by that H.323 gatekeeper are lost. In a central office or cable system installation, that could result in the loss of the accounting and billing data for ten thousand or more calls in progress. Also, replacing a failed H.323 gatekeeper is difficult because the call state information stored on the H.323 gatekeeper would have to be transferred to the replacement H.323 gatekeeper to prevent disruptions.

Another problem of the prior art is that it may be possible to circumvent the H.323 gatekeeper and thus the billing and access control systems. Techniques such as IP spoofing might be used to circumvent the H.323 gatekeeper and place calls without authorization.

If the prior art techniques are used, the H.323 gatekeeper represents a single non-redundant point of failure. Therefore, it is desirable to have a method of improving the reliability of the H.323 gatekeeper. If the prior art techniques are used, the H.323 gatekeeper billing and access control functions can be circumvented. Therefore, it is desirable to have a method of ensuring that the billing and access control functions of the H.323 gatekeeper can not be circumvented.

SUMMARY OF THE INVENTION

A method and apparatus for improving the scalability of H.323 systems is described. In some embodiments a gate controller and an edge router are used to support the H.323 call. The edge router transmits an admission request for an H.323 call on one of its ports to the gate controller. After transmitting the admission request, the edge router waits for an admission confirmation for the call from the gate controller. The admission confirmation indicates that the call can proceed and may also include, if necessary, the Internet Protocol (IP) address and the transmission control protocol (TCP) or user datagram protocol (UDP) port number of the called H.323 device. The edge router can store call state information about the call. The call state information can include whether the call is in progress, the ringing status, and/or amount of time underway, etc., as well as appropriate accounting and billing information. The call state information is updated once the admission confirmation is received.

In some embodiments, the edge router functions like an H.323 gateway, but keeps call information too. In some embodiments, the gate controller supports call transaction requests like an H.323 gatekeeper, but does not keep call state information.

In some embodiments, the edge router uses the gate controller to receive responses to registration, admission, and status (RAS) requests. Upon receiving responses from the gate controller, the edge router can update the call state information as appropriate.

In some embodiments, if the gate controller fails, the call can continue uninterrupted. Further, in some embodiments, a secondary gate controller can send a message to the edge router indicating the failure of the gate controller. The edge router can update the call state information after receiving the message and use the secondary gate controller to support registration, admission, and status requests associated with the call.

In some embodiments, if the gate controller fails, a secondary gate controller is activated with the same Internet protocol address as the gate controller. In this embodiment, the failure of the gate controller should pass without any changes at the edge router.

Standard H.323 terminals and gateways need no modification to communicate with other H.323 terminals and gateways coupled to the edge router/gate controller.

In some embodiments, the edge router additionally supports a standard network address translation (NAT) protocol.

This allows multimedia terminal adapters coupling the telephones to the edge router to have nonroutable IP addresses. By using nonroutable IP addresses, the devices coupled to the edge router cannot circumvent the billing and accounting systems. Additionally, the edge router can support an H.323 proxy server. The H.323 proxy server allows inward-bound calls from an H.323 device to reach terminals and telephones coupled to the edge router. In some embodiments, mobile domain name service (DNS) is used to support this functionality.

DETAILED DESCRIPTION

A. System Overview

Figure 1:
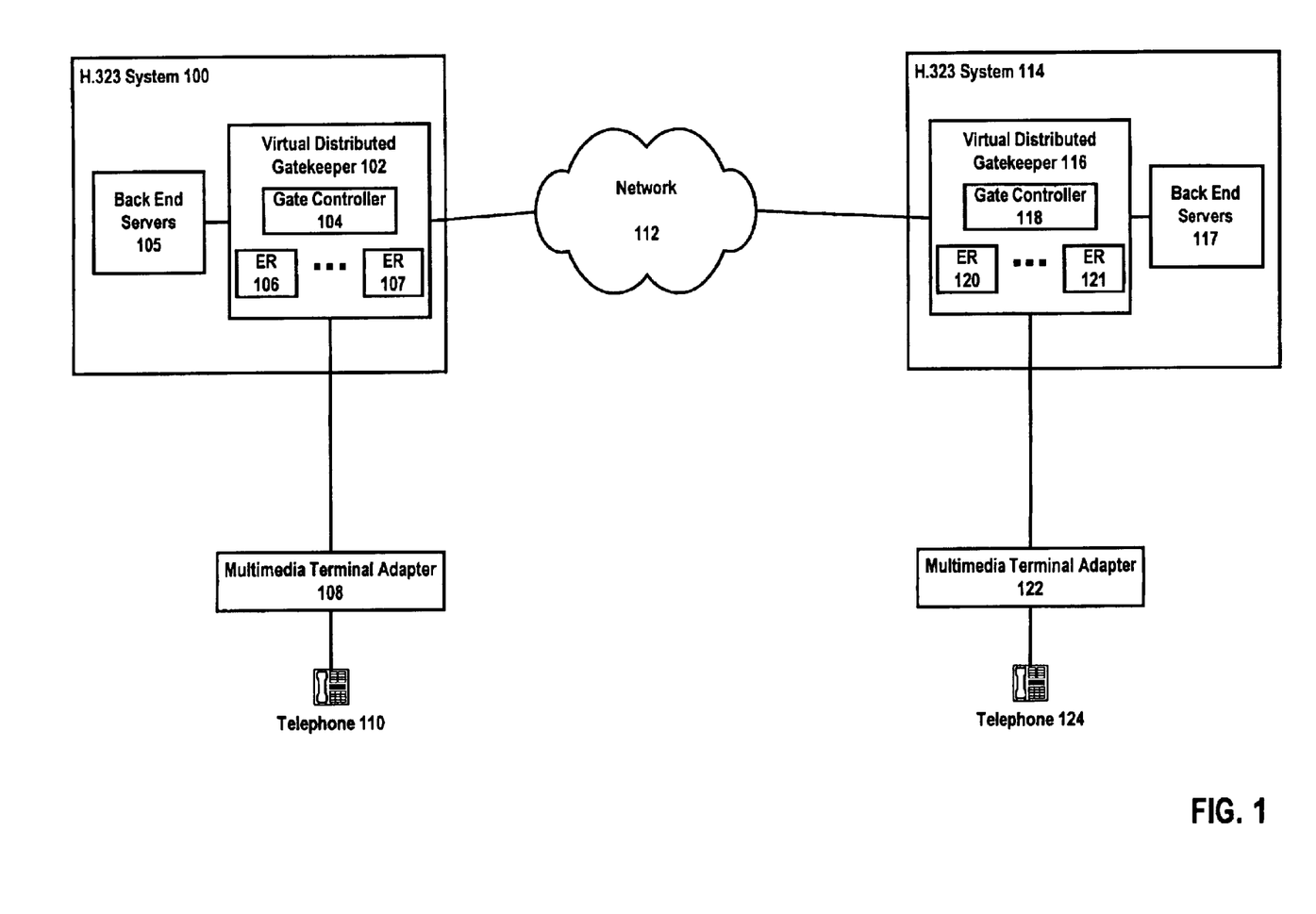
FIG. 1 is a block diagram of a network including one embodiment of the invention.

FIG. 1 is a block diagram of a network including one embodiment of the invention. This shows an installation of the system providing voice telephone service between two cable systems. The following description lists the elements of FIG. 1, their corresponding interconnections and then describes the elements.

This paragraph lists the elements of FIG. 1. FIG. 1 includes an H.323 system 100, a multimedia terminal adapter (MTA) 108, a telephone 110, a network 112, an H.323 system 114, a MTA 122, a telephone 124. The H.323 system 100 includes a virtual distributed gatekeeper 102 and back end servers (BESs) 105. The virtual distributed gatekeeper 102 includes a gate controller (GC) 104 and edge routers (ERs) 106–107. The H.323 system 114 includes a virtual distributed gatekeeper 116 and BESs 117. The virtual distributed gatekeeper 116 includes a GC 118 and ERs 120–121.

This paragraph describes the interconnections between the elements of FIG. 1. The telephone 110 is coupled in communication with the MTA 108. The MTA 108 is coupled in communication with the virtual distributed gatekeeper 102. The virtual distributed gatekeeper 102 is coupled in communication with the BESs 105 and the network 112. The network 112 is coupled in communication with the virtual distributed gatekeeper 116. The virtual distributed gatekeeper 116 is coupled in communication with the BESs 117 and the MTA 122. The MTA 122 is coupled in communication with the telephone 124.

The following describes the use of the elements of FIG. 1. The MTA 108 and the MTA 122 provide conversion of analog voice signals to the H.323 standard. In this example, the telephone 110 is coupled to the MTA 108 which allows voice conversations using the telephone 110 to be carried over a packet-based network such as the network 112. The MTA 108 and the MTA 122 may also include one or more of the following: a data-over-cable service interface specification (DOCSIS) interface, a bridge to a 10-Base-T network, a bridge to a home network, a G.711 codec for supporting analog telephony device, a G.723.1 low bit-rate codec, or codecs and low bit-rate codecs for encoding and decoding audio for transmission over the network 112, support for encryption and decryption, and support for video capture along with the associated codecs.

In non-cable systems, the combined MTA 108 and telephone 110 may be replaced by a personal computer, a video conferencing client device, an IP telephone, or some other device supporting IP-based signaling. In telephone central office installations, the functionality of the MTA 108 may be incorporated into the ERs 106–107 by providing G.711 codecs in the ERs 106–107 to support the conversion and packetization of the analog signal in the central office.

The H.323 system 100 is designed for installation in a cable central office but it could also be used in a telephone central office to replace circuit switched calling systems. In this example the H.323 system 100 is a cable office installation to provide telephone services over a cable system and a packet-based network. Packetized H.323 data flows from the MTA 108 into the virtual distributed gatekeeper 102. The virtual distributed gatekeeper 102 supports all of the functions normally provided by an H.323 gatekeeper and an H.323 gateway. The virtual distributed gatekeeper 102 offers greater scalability and redundancy than providing a standard H.323 gatekeeper and a standard H.323 gateway.

The H.323 packets flow into an edge router such as the ERs 106–107. The edge routers include the functionality of a standard H.323 gateway, providing IP ports for H.323 calls. Additionally, the ERs 106–107 provide a memory for storing call state information. In contrast, a standard H.323 gateway stores information about what ports are in use, but does not maintain call state information. Further, the ERs 106–107 may include a DOCSIS interface, support for a standard network address translation (NAT) protocol, and support for H.323 proxy services. In this example, the call from the telephone 110 is being routed through the ER 106.

The ER 106 communicates with the GC 104 on a transactional basis to receive responses to registration, admission, and status requests. Because the GC 104 is used on a transactional basis, no call state information need be stored in the GC 104. The GC 104 can access the BESs 105 for storing accounting and billing information received from the ERs 106–107.

If the GC 104 fails, a call handled by one of the ERs 106–107 is not disrupted. This is because call state information is stored on the edge router handling the call. However, the GC 104 can include a port status table. A port status table lists the usage status of each of the ports on ERs 106–107. The status for each port could be in use, available, or not functioning. Even if the GC 104 fails, the secondary gate controller can build a new port status table easily. One method of building the port status table is by sending one or more queries to the ERs 106–107 requesting port status information. Alternatively, the GC 104 can build the table incrementally as requests are made. Additionally, there is no disruption of billing information associated with the call because that information is only routed through the GC 104 to the BES 105.

If the GC 104 fails, it can be replaced by another gate controller without disruption of the calls in progress. One way of replacing the GC 104 after a failure is to activate another gate controller and assign it the same IP address that the GC 104 had prior to its failure. Another approach is to have a secondary gate controller send a message to the ERs 106–107 indicating that the GC 104 has failed and that the secondary gate controller is now providing registration, admission, and status functions for the ERs 106–107.

Another function offered by the ERs 106–107 is support for a standard network address translation (NAT) protocol, e.g. IETF RFC 1631. The NAT protocol allows multiple devices to use nonroutable, or local, IP addresses while sharing a single routable IP address provided by the device supporting the NAT protocol. Nonroutable IP addresses have been determined by the Internet Assigned Numbers Authority (IANA) in RFC 1918. One such range of nonroutable IP addresses are the IP addresses 192.168.0.0–192.168.255.255.

By using a NAT protocol, it is possible to conserve the IP address space and offer added security. If the MTA 108 is assigned a nonroutable IP address, it is not possible for the MTA 108 to bypass the ERs 106–107 to place a telephone call. Thus, the NAT protocol can be used to ensure that calls being placed over the H.323 system 100 are processed by the ERs 106–107 and that appropriate billing and accounting records are maintained on the BESs 105.

One limitation of the NAT protocol is that it does not easily allow for packets to be directed from a host with a routable IP address to a host with a nonroutable IP address. For example, if the MTA 108 has the nonroutable IP address 192.168.0.1, then the NAT protocol does not define an easy way to route appropriate incoming packets to the MTA 108. One extension to NAT is direct inward port mapping. While this offers a partial solution for some problems with the NAT protocol, it can be difficult to implement in a larger-scale implementation. Using direct inward port mapping with the NAT protocol, a port such as the port 25 which is used for the simple mail transport protocol (SMTP) can be mapped to a specific nonroutable host such as the nonroutable host 192.168.0.1, or the MTA 108. However, when there are several thousand nonroutable hosts behind the ERs 106–107, it is not possible to rely on direct inward port mapping with NAT to allow H.323 calls to be routed to the appropriate MTA.

An H.323 proxy server can be implemented on the ERs 106–107. In conjunction with the mobile domain name service (DNS), the H.323 proxy service can allow inward calls to the nonroutable hosts such as the MTA 108. The H.323 proxy service analyzes incoming H.323 packets to the ERs 106–107 and selects the appropriate multimedia terminal adapter to receive the packet based on the information in the packet and the information in the mobile DNS records.

If mobile DNS is not used, it may still be desirable to use the NAT protocol and nonroutable IP addresses for the MTAs. In this embodiment, each MTA is associated with a public, routable, IP address, and assigned a private, nonroutable, IP address. In this embodiment, the public, routable, IP address is configured to route packets to an edge router serving the MTA in the DNS system. When the edge router receives a packet with the destination address of a public, routable, IP address associated with an MTA, the edge router routes the packet to the MTA using the private, nonroutable IP address. Outgoing packets from an MTA can be altered to reflect the public IP address associated with the MTA.

The DNS information associates the public IP address with the ERs 106–107 and then using the H.323 proxy service and the NAT protocol, inward packets can easily be routed to the private IP address of the MTA.

It is possible to include a virtual gateway in the virtual distributed gatekeeper 102. The use and functionality of a virtual gateway is described in U.S. patent application Ser. No. 09/257,326, titled "Use of Virtual Gateway in H.323 System", by Carl Ketcham, filed Feb. 25, 1999. For example, a virtual gateway could be introduced in the H.323 system 100 to improve the scalability and port allocation among the ERs 106–107.

The H.323 system 114 is similarly configured with the functionality of the virtual distributed gatekeeper 116 the GC 118, the BESs 117, and the ERs 120–121 being the same as their counterparts in the H.323 system 100.

The virtual distributed gatekeeper 102 and the virtual distributed gatekeeper 116 can work seamlessly with existing H.323 devices such as a standard H.323 terminal coupled to the network 112. The virtual distributed gatekeeper is transparent to a standard H.323 terminal. For example if an H.323 terminal was contacting the H.323 system 114 over the network 112, no modifications are needed to the H.323 terminal to access the telephone 124 using the H.323 protocol.

The functions provided by the GC 104 and the GC 118 are collectively referred to by their acronym RAS, which stands for registration, admission, and status. These RAS services are important for billing, accounting, call management, bandwidth management and H.323 system management. Because the GC 104 and the GC 118 are transaction oriented, there is little or no state information stored on the gate controllers. Instead, upon receiving a request, the gate controller contacts its respective back-end servers to satisfy the request. For example, the GC 104 contacts the BESs 105 to satisfy requests from the ERs 106–107.

The gate controllers do provide bandwidth management. To support this functionality, the gate controller may maintain information about port usage among the edge routers and available bandwidth to the network 112. However, this information can be recreated should the gate controller fail. For example, the gate controller could poll port status information from the edge routers using a broadcast message.

Importantly, if the gate controller fails, no call state information is lost. The only thing lost in the case of a gate controller failure are the pending requests. Because the requests can be designed to require a confirmation or response, the edge routers can resend requests should a gate controller fail and not confirm or respond to a request.

The BESs 106 and BESs 117 are adjuncts of the virtual distributed gatekeepers. The BESs 106 and the BESs 117 provide support services such as directory lookup from names to addresses, rating services, billing, accounting services, inter-carrier settlements, user authentication, and other support services for the gate controller. Messaging between the gate controllers and the back end servers supports these services.

Because the gate controllers do not need to store state information, the reliability of H.323 systems is improved. This allows the H.323 system to support a greater number of ports as well because there is no single device that has to store call state information for tens of thousands of calls.

B. Call Setup Process

Figure 2A:
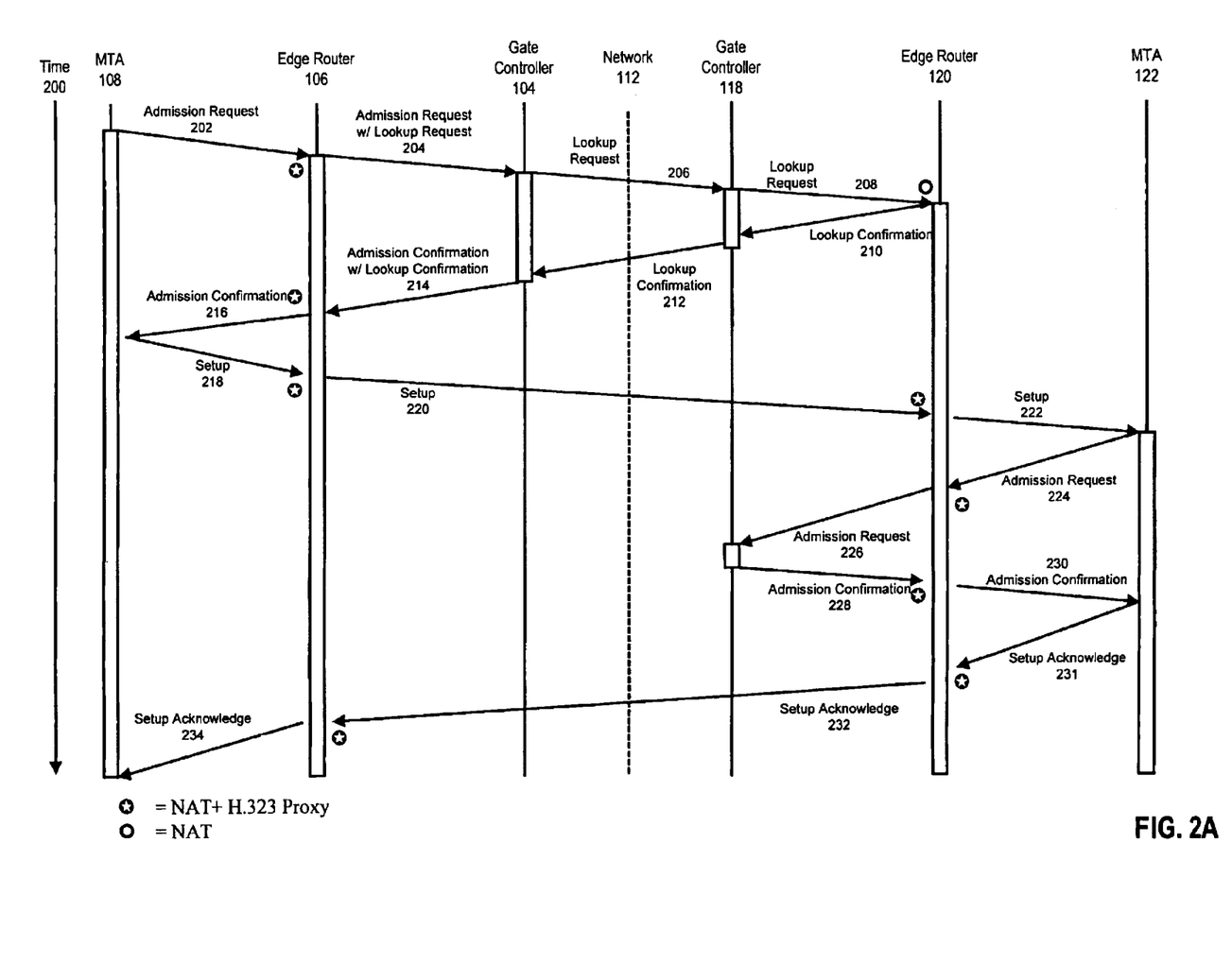
FIGS. 2A and 2B are process flow diagrams of the call setup process according to one embodiment of the invention.
Figure 2B:
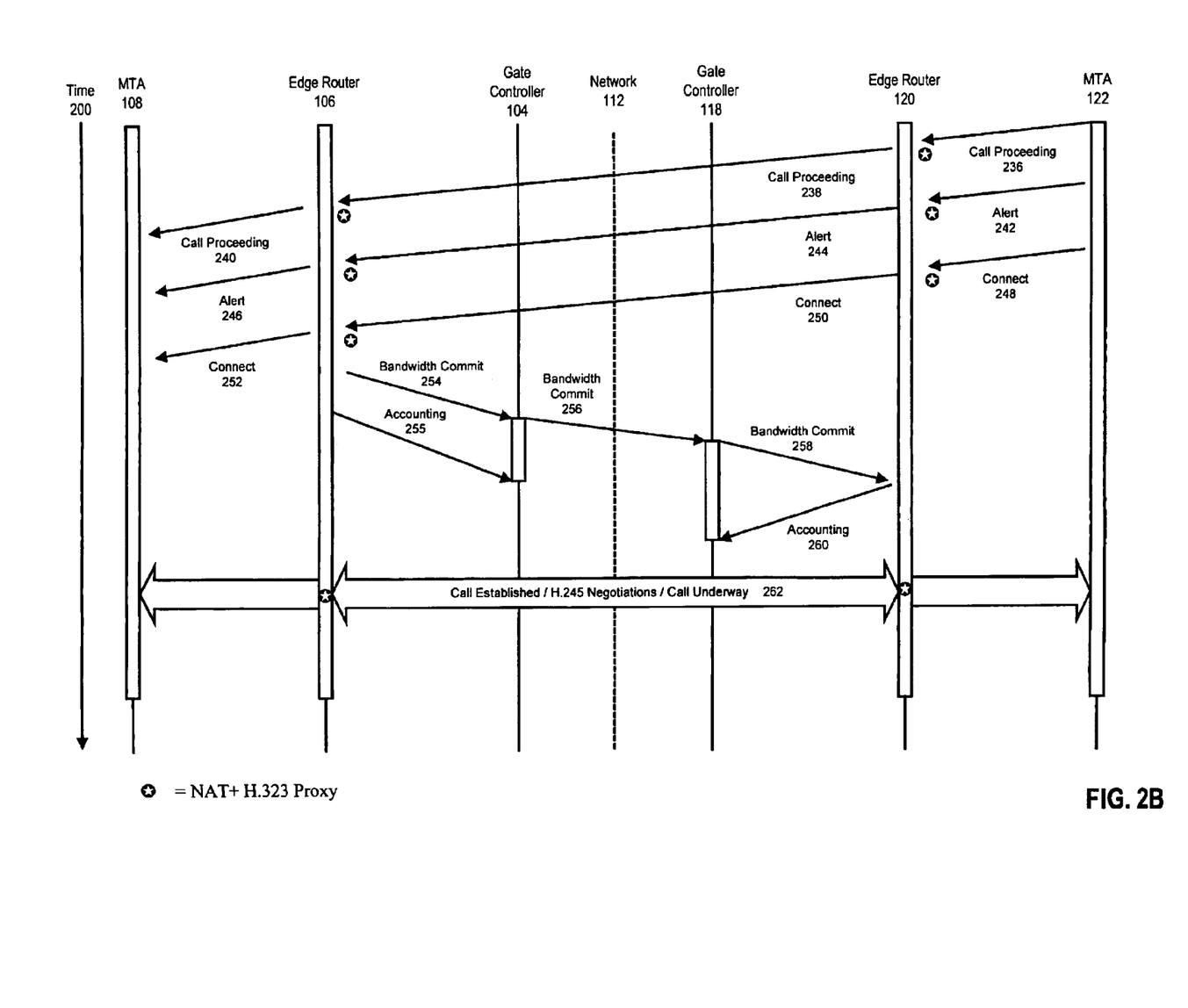

FIGS. 2A and 2B are process flow diagrams of the call setup process according to one embodiment of the invention. This could be used to control the setup of a call between the telephone 110 and the telephone 124 of FIG. 1.

FIGS. 2A and 2B are drawn using principles from the Unified Modeling Language. The flow of time is from earliest, top of FIG. 2A, to latest, bottom of FIG. 2B, as indicated by the arrow 200. Each of the participants in the call setup process is shown as a narrow line with a thicker box indicating periods during which the participant is active in the process. Messages between participants are shown as directed lines from one participant to another.

From left to right, the participants are the MTA 108, the edge router 106, the GC 104, the GC 118, the ER 120, and the MTA 122. The network 112 is indicated as a dotted line between the GC 104 and the GC 118.

The process will now be described in chronological order. First, at time 202, the MTA 108 sends an admission request to the edge router 106. An admission request is a request by a particular H.323 terminal or gateway (e.g. the MTA 108) for permission to use the network for a particular call. The admission request includes information about the device requesting access, along with information about what sort of access is requested. For example, the request could include: the amount of bandwidth requested, the called party's name and/or number, the calling party's user authentication information, and/or other information.

At time 204, the ER 106 forwards the admission request to the GC 104 with a lookup request. The admission request includes the lookup request and serves as a request for the gate controller to grant the MTA 108 access and to lookup the Internet Protocol address of the call destination (e.g. the MTA 122). The MTA 108 can have a nonroutable IP address in some embodiments. If the MTA 108 has a nonroutable IP address, the ER 106 can support the NAT protocol and an H.323 proxy service. In this example, the MTA 108 has a nonroutable IP address and the ER 106 supports the NAT protocol and an H.323 proxy service. Accordingly, the nonroutable IP address in packets sent from the MTA 108 to the ER 106 is remapped by the ER 106 into a routable IP address before being forwarded to other devices.

At time 206, the GC 104 forwards the lookup request to the GC 118. The forwarded lookup request may omit certain details from the original admission request such as the calling party's user authentication information. The GC 104 may also access the BESs 105 to verify the calling party's user authentication information, determine the called party's address, or request rate and billing information for the call. This information need not be immediately provided to the ER 106 and can be included with the lookup confirmation provided at time 214. Alternatively, the ER 106 could request this information separately.

At time 208, the GC 118 forwards the lookup request to one of the ERs 120–121. The GC 118 will select one of the ERs 120–121 to receive the lookup request based upon port usage information on the GC 118 and other information such as if a particular destination is only served by a particular edge router or group of edge routers. In this example, the GC 118 forwards the lookup request to the ER 120.

Next, at time 210, the ER 120 returns a lookup confirmation. The lookup confirmation includes the port address to be used for the call. If the NAT protocol and H.323 proxy services are being used to support the call, the ER 120 will setup the NAT port mapping tables and H.323 proxy services to route packets received on the port address to the correct multimedia terminal adapter for the call, here the MTA 122.

Next, at time 212, the GC 118 forwards the lookup confirmation to the GC 104. Because call state information is not stored on the GC 118, the only thing that needs to be stored on the GC 118 is the port allocation on the ER 120.

Next, at time 214, an admission confirmation is sent to the ER 106. At this point, the GC 104 need not store any data about the call. The admission confirmation may include information that the GC 104 retrieved from the BESs 105 to authorize the call, including billing and rate information. Additionally, the admission confirmation includes the addressing information for the remote terminal (e.g. the MTA 122) from the lookup confirmation.

Then, at step 216, the admission confirmation is sent from the ER 106 to the MTA 108. The admission confirmation indicates that the call may proceed and includes the port address at the ER 106 to use for the call.

Next, at time 218, the MTA 108 forwards a setup request to the ER 106. At time 220, the ER 106 forwards the setup request to the ER 120. Because the ER 106 and the ER 120 are supporting the NAT protocol and H.323 proxy services in this example, all packets between the MTA 108 and the MTA 122 pass through the edge routers to reach the other MTA.

At time 222, the ER 220 forwards the setup request to MTA 122.

Next, at time 224, in order to use bandwidth for the call, the MTA 122 sends an admission request to the ER 120. The admission request sent at time 224 is similar to the admission request sent at time 202.

At time 226, the admission request is forwarded to the GC 118. The GC 118 contacts the BESs 117 to verify the user authentication information provided in the admission request. Also, billing and rate information can be retrieved.

Next, at time 228, the GC 118 sends an admission confirmation to the ER 120. The admission confirmation includes billing and rate information. The GC 118 need not store any call state information about the call once the admission confirmation is sent.

At time 230, the admission confirmation is forwarded to the MTA 122.

Next, at time 231, the MTA 122 acknowledges the setup request. The setup acknowledge is relayed back to the MTA 108 at times 232–234.

With the setup request acknowledged, the call can now proceed. In the H.323 standard, the receiving end sends messages indicating that the call is proceeding, ringing, etc. In this example, the MTA 122 relays call proceeding messages to the MTA 108 via the edge routers at times 236–240. As the MTA 122 rings the telephone 124 attached to the MTA 122, alert messages are relayed from the MTA 122 to the MTA 108 at times 242–246. When the telephone 124 is picked up, the MTA 122 relays connect messages to the MTA 108 at times 248–252.

Once the callers are connected, the bandwidth is committed. The ER 106 sends a bandwidth commit message to the GC 104 at time 254. The present H.323 standard does not include such as message. In some embodiments, the bandwidth commit message is a proprietary message. In other embodiments, the H.323 standard is extended to include a bandwidth commit message. The GC 104 forwards the bandwidth commit message to the GC 118 at time 256. The GC 118 forwards the bandwidth commit message to ER 120 at time 258. The bandwidth commit message can be used by the gate controllers to update their management information about bandwidth in use without reference to a particular call.

Additionally, at time 255, the ER 106 generates an accounting message to the GC 104. This message can be sent at any time after the bandwidth commit message. The accounting message indicates that a call started at a particular time. In some embodiments, the message includes the amount of bandwidth and types of services being used. The GC 104 will store that information in the BESs 105. Once the accounting message has been stored on the BESs 105, the GC 104 need not maintain any call state information. However, the GC 104 may optionally maintain call state information. At time 260, the ER 120 sends an accounting message to the GC 118. This allows both the calling and called party to be billed for calls as is appropriate based on the rate plan and bandwidth used by the call.

Finally, at time 262, the final call negotiations (e.g. capability exchange, master-slave determination, communication mode setup, etc.) take place to establish the call. This includes H.323 call negotiations using the H.245 protocol. After the H.245 negotiations are complete, logical channels are opened between the two MTAs that allow the telephones coupled to the MTAs to communicate.

If during the call, additional bandwidth is needed, the edge routers will repeat the process shown at times 254–260. Similarly, when the call is finished, call teardown, bandwidth release and/or accounting messages will be generated in a fashion similar to those shown in steps 254–260.

In this fashion, the GC 104 and the GC 118 are used for transaction processing rather than to store state information.

Because the gate controllers only need to respond in a transaction oriented fashion, any failure of a gate controller is noncritical and does not disrupt the call or the accounting for a call in progress. As each of the messages is relayed through the ERs 106 and 120, call state information is constantly updated as appropriate on the edge router.

For each port where call state information is being maintained, the information stored on the edge router can include: the amount of bandwidth currently in use, the amount of bandwidth authorized for the call, user authentication information associated with the call, the length of the call, the start time of the call, and rate information associated with the call.

In some embodiments, if the gate controller fails, a secondary gate controller can assume the responsibilities of the failed gate controller. In one embodiment, upon a failure of the gate controller, e.g. the GC 104, a secondary gate controller in the H.323 system 100 is activated with the same IP address that the GC 104 was using. For example, if the GC 104 had the IP address 192.168.100.100, the secondary gate controller could assume that IP address upon the failure of the GC 104. In this configuration, the ERs 106–107 do not need to be directly notified of the failure of the GC 104. Any pending requests from the ERs 106–107 to the GC 104 will not be acknowledged and will eventually be resent using the same IP address and will be sent to the secondary gate controller.

In other embodiments, the secondary gate controller monitors the GC 104 and upon a failure, sends a message to the ERs 106–107 indicating that the GC 104 has failed and indicating that the secondary gate controller will provide the services previously provided by the GC 104. Upon receiving the message from the secondary gate controller, the ERs 106–107 can re-transmit any pending requests to the secondary gate controller. Further, future requests will be sent to the IP address of the secondary gate controller.

C. Alternative Embodiments

Some embodiments of the invention include interface cards implementing one or more edge routers and/or implementing one or more gate controllers. The interface cards could be used in a Total Control™ Multiservice Access Platform provided by 3Com Corporation, Santa Clara, Calif.

In addition to using the network address translation protocol to prevent the billing systems from being bypassed, internal IP address spoofing can be prevented by using an identifier associated with each MTA. For example, if the MTA uses the DOCSIS standard, each device has a unique identifier. Similarly, if the MTA uses the Ethernet standard, every Ethernet device includes a unique medium access control (MAC) address.

In some embodiments, the virtual distributed gatekeeper can be hardware based, software based, or a combination of the two. In some embodiments, edge router programs and gate controller programs are included in one or more computer usable media such as CD-ROMs, floppy disks, or other media.

Some embodiments of the invention are included in an electromagnetic wave form. The electromagnetic wave form comprises information such as edge router programs and gate controller programs. The electromagnetic waveform might include the edge router programs and gate controller programs accessed over a network.

D. Conclusion

Therefore, a method and apparatus for a virtual distributed gatekeeper has been described. The virtual distributed gatekeeper improves the scalability and the reliability of H.323 systems. The virtual distributed gatekeeper improves the redundancy of an H.323 system by eliminating the gatekeeper as a single point of failure. The virtual distributed gatekeeper supports protocols that reduce the ability of a user to circumvent the billing and authorization systems while also conserving IP addresses.

What is claimed is:

1. A method of supporting an H.323 call using an H.323 system, the H.323 system including an edge device and a call-switching device, the edge device coupled in communication with the call-switching device, the edge device having a first H.323 port, the method comprising:

receiving from an H.323 node a first admission request transmitting from the edge device to the call-switching device a second admission request for the H.323 call;

responsive to transmitting the second admission request, receiving from the call-switching device at the edge device an admission confirmation for the H.323 call indicating that the H.323 call can proceed;

storing on the edge device call state information corresponding to a state of the H.323 call;

updating the call state information on the edge device after receiving the admission confirmation, responsive to receiving at the edge device a first registration request associated with the H.323 call, transmitting from the edge device to the call-switching device a second registration request corresponding to the first registration request;

responsive to transmitting the second registration request, receiving from the call-switching device on the edge device a first response to the second registration request; and updating the call status information on the edge device after receiving the first response to the corresponding request.

2. The method of claim 1, further comprising responsive to receiving the first response, transmitting from the edge device to the H.323 terminal a second response corresponding the first response.

3. The method of claim 1, wherein if a failure in the call-switching device occurs, the H.323 call continues uninterrupted.

4. The method of claim 3, wherein the H.323 system includes a second call-switching device coupled in communication with the edge device, and the method further comprising:

receiving a message from the second call-switching device at the edge device, the message indicating the failure in the call-switching device;

updating the call state information after receiving the message;

using the second call-switching device to support at least one of a registration request, an admission request, and a status request associated with the H.323 call; and updating the call status information on the edge device responsive to the using.

5. The method of claim 4, wherein the H.323 system includes a back end server, and the step of using the second call-switching device to support at least one of a registration request, an admission request, and a status request associated with the H.323 call further comprises generating for transmission to the back end server an accounting message for the H.323 call.

6. The method of claim 3, wherein the H.323 system includes a second call-switching device, and wherein the call-switching device has an Internet protocol (IP) address, and the method further comprising assigning the second call-switching device the IP address of the call-switching device after the failure in the call-switching device.

7. The method of claim 3, wherein billing information associated with the H.323 call is maintained after failure of the call-switching device.

8. The method of claim 1, wherein the first H.323 port has a first Internet protocol (IP) address, wherein the H.323 node uses the edge device as an H.323 gateway for the H.323 call, wherein the H.323 node has a second IP address, and the method further comprising:
   supporting a standard network address translation (NAT) protocol on the edge device;
   receiving from the H.323 node at the edge device an H.323 packet; and
   using the standard NAT protocol to translate the H.323 packet so as to define the first IP address as a source address of the H.323 packet.

9. The method of claim 8, further comprising:
   supporting on the edge device an H.323 proxy service;
   receiving at the first H.323 port a second H.323 packet destined for the H.323 terminal, the second packet including a destination address of the first IP address; and
   using the H.323 proxy server and the NAT protocol to translate the second H.323 packet so as to define the second IP address as the destination address.

10. The method of claim 1, wherein the call state information includes at least one of a call state, a bandwidth authorized amount, a bandwidth in use amount, a ringing status, a call timer, a call start time, and a list of open logical channels.

11. The method of claim 1, further comprising:
   responsive to receiving at the edge device a first status request associated with the H.323 call, transmitting from the edge device to the call-switching device a second status request corresponding to the first status request;
   responsive to transmitting the second status request, receiving from the call-switching device on the edge device a first response to the second status request; and
   updating the call status information on the edge device after receiving the first response to the second status request.

12. The method of claim 11, further comprising responsive to receiving the first response, transmitting from the edge device to the H.323 terminal a second response corresponding the first response.

13. A virtual-distributed gatekeeper device comprising:
   a first communication channel for coupling the virtual-distributed gatekeeper device in communication with at least one H.323 device;
   a second communication channel for coupling the virtual-distributed gatekeeper device in communication with at least one element of packet-based network, the at least one element of the packet-based network generating requests and receiving responses to at least one of a registration request, an admission request, and a status request, the virtual-distributed gatekeeper device having an Internet protocol (IP) address for use on the packet-based network;
   a memory for holding call state information, the call state information including information about H.323 calls placed by the at least one H.323 device coupled in communication with the virtual-distributed gatekeeper device; and
   a processor for processing communications on the first channel and second channels.

14. The virtual-distributed gatekeeper device of claim 13, wherein the processor supports a standard network address translation (NAT) protocol and an H.323 proxy server, the processor capable of translating a packet received over the first communication channel and routing the packet onto the packet-based network after applying the NAT protocol and the H.323 proxy server, the processor capable of translating a packet received over the second communication channel and routing the packet to the H.323 device after applying the NAT protocol and the H.323 proxy server.

15. The virtual-distributed gatekeeper device of claim 13 further comprising:
   a third communication channel for coupling the gate controller in communication with elements of a packet-based network, the elements of the packet-based network including a plurality of H.323 ports and a back end server;
   a second memory for holding a port status table and a cache, the port status table indicating the status of each of the plurality of H.323 ports;
   a second processor for supporting registration, admission and status functions for each of the plurality of H.323 ports, the processor capable of processing at least one of a registration request, an admission request, and a status request received over the first communication channel from an H.323 port of the plurality of H.323 ports.

16. The virtual-distributed gatekeeper device of claim 15, wherein the processor uses the cache to store the corresponding request, the processor capable of communicating over the first communication channel with a back end server to process the corresponding request, and the processor transmitting a response to the corresponding request after communicating with the back end server.

17. A system comprising:
   an edge device having a first H.323 port and a memory, the memory containing call state information, the call state information including a call state for an H.323 call on the first H.323 port;
   a call-switching device for responding to at least one of a registration request, an admission request, and a status request for the edge device, wherein the edge device comprises a modified H.323 gateway storing a parameter indicative representative of the H.323 port and the call state information corresponding to a state of an H.323 call, and wherein the call-switching device comprises a modified H.323 gatekeeper for processing transactional call state information corresponding to a state of the H.323 call, whereby the modified H.323 gatekeeper does not maintain call state for the H.323 call.

18. The system of claim 17, wherein the H.323 call has a duration, and wherein the modified H.323 gateway stores the parameter indicative of the H.323 port and the call state information corresponding to the state of the H.323 call for the duration of the call.

19. The system of claim 17, wherein the modified H.323 gatekeeper supports responding to an admission request, and wherein the modified H.323 gatekeeper is operable to:
   receive the call state information with the admission request; and
   not store the call state information after responding to the admission request.

20. An edge apparatus for supporting an H.323 call, the H.323 call placed using an H.323 port on the edge apparatus, the edge apparatus comprising:

means for storing a call state information about the H.323 call;

means for generating for transmission to a call-switching device an admission request for the H.323 call;

means for receiving from the call-switching device an admission confirmation for the H.323 call; and means for updating on the edge device the call sate information after receiving the admission confirmation means for transmitting from the edge device to the call-switching device a second registration request corresponding to a first registration request associated with the H.323 call;

means for receiving from the call-switching device on the edge device a first response to the second registration request, and means for updating the call status information on the edge device after receiving the first response to the corresponding request.

21. The apparatus of claim 20, further comprising means for supporting a standard network address translation protocol.

22. The apparatus of claim 20, further comprising means for supporting an H.323 proxy service.

23. A method of supporting an H.323 call using an H.323 system, the H.323 system including an edge device and a call-switching device, the edge device coupled in communication with the call-switching device, the edge device having a first H.323 port, the method comprising:

receiving from an H.323 terminal a first request for call-admission control of the H.323 call, the first request being addressed to the edge device;

transmitting from the edge device to the call-switching device unbeknownst to the H.323 terminal a second request for call-admission control of the H.323 call;

responsive to transmitting the second request, receiving from the call-switching device at the edge device an call-admission-control confirmation for the H.323 call indicating that the H.323 call can proceed;

storing on the edge device call state information corresponding to a state of the H.323 call;

updating the call state information on the edge device after receiving the admission confirmation;

responsive to receiving at the edge device a first registration request associated with the H.323 call, transmitting from the edge device to the call-switching device a second registration request corresponding to the first registration request;

responsive to transmitting the second registration request, receiving from the call-switching device on the edge device a first response to the second registration request; and updating the call status information on the edge device after receiving the first response to the corresponding request.

24. The method of claim 23, wherein the first and second requests for call-admission control of the H.323 call comprise any of a request for admission, a request for registration, and a request for status, wherein the call-admission-control confirmation for the H.323 call comprises any of a confirmation of the request for admission, a confirmation of the request for registration, and a confirmation of the request for status, and wherein updating the call state information on the edge device comprises updating the call state information on the edge device in response to any of the confirmation of the request for admission, the confirmation of the request for registration, and the confirmation of the request for status.

25. The method of claim 24, further comprising responsive to receiving the call-admission-control confirmation, transmitting from the edge device to the H.323 terminal a response corresponding to the call-admission-control confirmation.

26. The method of claim 23, wherein when a failure in the call-switching device occurs, the H.323 call continues uninterrupted.

27. The method of claim 26, wherein the H.323 system includes a second call-switching device coupled in communication with the edge device, and the method further comprising:

receiving a message from the second call-switching device at the edge device, the message indicating failure of the call-switching device;

updating the call state information after receiving the message;

using the second call-switching device to support the call-admission control for the H.323 call; and updating the call state information on the edge device responsive to the call-admission-control.

28. The method of claim 27, wherein the H.323 system includes a back-end server, and the step of using the second call-switching device to support the call-admission control for the H.323 call further comprises generating for transmission to the back-end server an accounting message for the H.323 call.

29. The method of claim 26, wherein the H.323 system includes a second call-switching device, and wherein the call-switching device has an Internet protocol (IP) address, and the method further comprising assigning to the second call-switching device after failure of the call-switching device the IP address of the call-switching device.

30. The method of claim 26, wherein billing information associated with the H.323 call is maintained after failure of the call-switching device.

31. The method of claim 23, wherein the first H.323 port has a first Internet protocol (IP) address, wherein the H.323 terminal uses the edge device as an H.323 gateway for the H.323 call, wherein the H.323 terminal has a second IP address, and the method further comprising:

supporting on the edge device a standard network address translation (NAT) protocol;

receiving from the terminal an H.323 packet; and using the standard NAT protocol to translate the H.323 packet so as to define the first IP address as a source address of the H.323 packet.

32. The method of claim 31, further comprising:

supporting on the edge device an H.323 proxy service;

receiving at the first H.323 port a second H.323 packet destined for the H.323 terminal, the second packet having a destination address of the first IP address; and using the H.323 proxy server and the NAT protocol to translate the second H.323 packet so as to define the second IP address as the destination address.

33. The method of claim 23, wherein the call state information includes at least one of a call state, a bandwidth authorized amount, a bandwidth in use amount, a ringing status, a call timer, a call start time, and a list of open logical channels.

34. An edge device comprising:

a first communication channel for carrying on communication with at least one H.323 device, the edge device operable to receive from the at least one H.323 device over the first communication channel a first request for call-administration control of an H.323 call for the H.323 device, the first request being addressed to the edge device;

a second communication channel for carrying on communication with at least one element of a packet-based network, the edge device operable to send to the at least one element of the packet-base network over the second communication channel unbeknownst to the at least one H.323 device a second request for call-admission control of the H.323 call for the H.323 device;

a memory for holding call state information about the H.323 call device; and a processor for processing communications on the first and second channels.

35. The edge device of claim 34, wherein the call-admission control includes a standard network address translation (NAT) protocol and an H.323 proxy service, wherein the processor is operable to use the standard NAT protocol and the H.323 proxy service to translate and route into the packet-based network an H.323 packet received over the first communication channel, and wherein the processor is operable to use the standard NAT protocol and the H.323 proxy service to translate and route to the H.323 device a packet received over the second communication channel.

36. A gate controller comprising:

a first communication channel for carrying on communication with at least one element of packet-based network, the at least one element packet-based network including a plurality of H.323 ports and a back end server, any of the plurality of H.323 ports operable to transmit unbeknownst to an H.323 terminal coupled to the H.323 port a request for call-admission control for an H.323 call originated from the H.323 terminal;

a memory for holding a port status table, the port status table indicating the status of each of the plurality of H.323 ports;

a processor for supporting call-admission control for each of the plurality of H.323 ports, the processor capable of processing unbeknownst to the H.323 terminal at least one request for call-admission control received over the first communication channel from a given H.323 port of the plurality of H.323 ports.

37. The gate controller of claim 36, wherein the memory includes a cache for storing the corresponding request, wherein the processor is operable to communicate with a back end server over the first communication channel to process the corresponding request, and wherein the processor is operable to transmit a response to the corresponding request after communicating with the back end server.

38. A system comprising:

a call switching device for responding to call-admission control requests for H.323 calls; and an edge device having a first H.323 port and a memory, the memory storing call state information about an H.323 call originated from an H.323 terminal coupled to the first H.323 port, the edge device operable to:

(i) receive a request for call-admission control for the H.323 call;

(ii) transmit to the call-switching device unbeknownst to the H.323 terminal a second request for call-admission control for the H.323 call; and (iii) receive from the call-switching device a response corresponding the second request for call-admission control for the H.323 call.

39. The system of claim 38, wherein the edge device further comprises a modified H.323 gateway, the modified H.323 gateway operable to store a parameter indicative of the H.323 port and call state information corresponding to a state of the H.323 call, and wherein the call-switching device comprises a modified H.323 gatekeeper, the modified H.323 gatekeeper operable to process transactional call state information corresponding to a state of the H.323 call, whereby the modified H.323 gatekeeper does not maintain call state for the H.323 call.

40. The system of claim 39, wherein the H.323 call has a duration, wherein the modified H.323 gateway is operable to store the parameter indicative of the H.323 port and the call state information corresponding to the state of the call on the H.323 port for the duration of the call.

41. The system of claim 39, wherein the modified H.323 gatekeeper supports responding to a request for admission, and wherein the modified H.323 gatekeeper is operable to:

receive the call state information with the admission request; and not store the call state information after responding to the admission request.

* * * * *